United States Patent
Lu et al.

(10) Patent No.: US 9,045,222 B2
(45) Date of Patent: Jun. 2, 2015

(54) CONSTANT AREA VENT FOR EXTERNAL CRASH ATTENUATION AIRBAG

(75) Inventors: Zi Lu, Coppell, TX (US); Cheng-Ho Tho, Irving, TX (US); Michael R. Smith, Colleyville, TX (US); Andrew T. Hill, Arlington, TX (US); Samgeeth Rajan, Whitefield (IN)

(73) Assignee: Textron Innovations Inc., Providence, RI (US)

( * ) Notice: Subject to any disclaimer, the term of this patent is extended or adjusted under 35 U.S.C. 154(b) by 126 days.

(21) Appl. No.: 13/699,758

(22) PCT Filed: Mar. 30, 2011

(86) PCT No.: PCT/US2011/030514
§ 371 (c)(1),
(2), (4) Date: Nov. 26, 2012

(87) PCT Pub. No.: WO2012/134462
PCT Pub. Date: Oct. 4, 2012

(65) Prior Publication Data
US 2013/0068883 A1 Mar. 21, 2013

Related U.S. Application Data

(63) Continuation-in-part of application No. PCT/US2011/025857, filed on Mar. 30, 2012.

(51) Int. Cl.
*B64C 25/56* (2006.01)
*B64C 27/00* (2006.01)

(52) U.S. Cl.
CPC ........... *B64C 27/006* (2013.01); *B64D 2201/00* (2013.01)

(58) Field of Classification Search
CPC ...... B64D 2201/00; B64D 25/00; B64D 1/14; B64C 2025/325; B64C 27/006; B64C 25/56; B60V 3/08
USPC ...................... 244/100 A, 105, 107, 101, 121
See application file for complete search history.

(56) References Cited

U.S. PATENT DOCUMENTS

| 2,131,528 | A | 9/1938 | Soyer |
| 2,713,466 | A | 7/1955 | Fletcher et al. |

(Continued)

FOREIGN PATENT DOCUMENTS

| DE | 3024551 A1 | 1/1982 |
| DE | 4118300 A1 | 12/1992 |

(Continued)

OTHER PUBLICATIONS

"CABS Cockpit Air Bag System," Armor Holdings Aerospace & Defense Group, Jan. 2006.

(Continued)

*Primary Examiner* — Tien Dinh
*Assistant Examiner* — Alexander V Giczy
(74) *Attorney, Agent, or Firm* — James E. Walton; Damon R. Hickman

(57) ABSTRACT

The external crash attenuation airbag includes an inflatable bladder which is inflatable to an exterior of an aircraft, so that the inflatable bladder is generally located between the aircraft and a crash surface when inflated. The airbag includes a vent configured to burst at a predefined burst pressure, the vent being located along a side portion of the inflatable bladder. The airbag also includes a vent support located approximate the vent, the vent support being configured to prevent deformation and therefore maintain the effectiveness of a venting area of the vent, and the vent support being rigid and annular and includes an upper portion and a lower portion that are hinged together around the vent.

17 Claims, 5 Drawing Sheets

(56) References Cited

U.S. PATENT DOCUMENTS

| | | | |
|---|---|---|---|
| 3,117,752 A * | 1/1964 | Gillmore | 244/138 R |
| 3,602,661 A | 8/1971 | Liedberg | |
| 3,603,535 A | 9/1971 | DePolo | |
| 3,727,716 A | 4/1973 | Jenkins | |
| 3,738,597 A | 6/1973 | Earl et al. | |
| 3,964,698 A | 6/1976 | Earl | |
| 3,981,462 A | 9/1976 | Berezhnoi et al. | |
| 3,990,658 A | 11/1976 | Letsinger | |
| 4,004,761 A | 1/1977 | McAvoy | |
| 4,032,088 A | 6/1977 | McAvoy | |
| 4,068,606 A | 1/1978 | Van Veldhuzen | |
| 4,205,811 A * | 6/1980 | Palm et al. | 244/100 A |
| 4,657,516 A | 4/1987 | Tassy | |
| 4,923,145 A * | 5/1990 | Broadhurst | 244/100 A |
| 5,259,574 A * | 11/1993 | Carrot | 244/100 A |
| 5,356,097 A | 10/1994 | Chalupa | |
| 5,407,150 A | 4/1995 | Sadleir | |
| 5,560,568 A | 10/1996 | Schmittle | |
| 5,725,244 A | 3/1998 | Cundill | |
| 5,765,778 A | 6/1998 | Otsuka | |
| 5,836,544 A | 11/1998 | Gentile | |
| 5,992,794 A | 11/1999 | Rotman et al. | |
| 6,062,599 A * | 5/2000 | Forbes et al. | 280/737 |
| 6,070,546 A | 6/2000 | Downey et al. | |
| 6,158,691 A | 12/2000 | Menne et al. | |
| 6,227,325 B1 | 5/2001 | Shah | |
| 6,273,463 B1 | 8/2001 | Peterson et al. | |
| 6,338,456 B1 | 1/2002 | Cairo-Iocco et al. | |
| 6,439,256 B2 | 8/2002 | Koelsch et al. | |
| 6,565,431 B1 * | 5/2003 | Villela | 454/365 |
| 6,648,371 B2 | 11/2003 | Vendely et al. | |
| 6,820,898 B2 | 11/2004 | Dinsdale et al. | |
| 6,886,776 B2 | 5/2005 | Wagner et al. | |
| 7,232,001 B2 | 6/2007 | Hakki et al. | |
| 7,954,752 B2 * | 6/2011 | Smith et al. | 244/17.17 |
| 8,418,957 B2 * | 4/2013 | Smith et al. | 244/100 A |
| 2002/0027353 A1 * | 3/2002 | Keshavaraj | 280/743.2 |
| 2003/0062443 A1 | 4/2003 | Wagner et al. | |
| 2003/0192730 A1 | 10/2003 | Kikuchi et al. | |
| 2005/0077426 A1 | 4/2005 | Simard | |
| 2007/0246922 A1 | 10/2007 | Manssart | |
| 2008/0017754 A1 * | 1/2008 | Taylor et al. | 244/100 A |
| 2008/0087511 A1 | 4/2008 | Taylor et al. | |
| 2010/0044507 A1 * | 2/2010 | Smith et al. | 244/110 R |

FOREIGN PATENT DOCUMENTS

| | | | |
|---|---|---|---|
| EP | 0423981 A1 | 10/1990 | |
| EP | 0869058 A2 | 10/1998 | |
| EP | 1403180 A2 | 3/2004 | |
| EP | 1575810 A1 | 9/2005 | |
| JP | 5322496 A | 12/1993 | |
| JP | 8192797 | 7/1996 | |
| JP | 11268605 A | 10/1999 | |
| WO | 2006046038 A2 | 5/2006 | |
| WO | WO 2008054401 A2 * | 5/2008 | B64D 25/18 |
| WO | 2011014153 A1 | 2/2011 | |
| WO | 2012115633 A1 | 8/2012 | |

OTHER PUBLICATIONS

Akif Bolukbasi, "Active Crash Protection Systems for UAVs," American Helicopter Society Annual Forum 63 Proceedings, Virginia Beach, VA, May 1-3, 2007.

Akif Bolukbasi, "Active Crash Protection Systems for Rotorcraft," Center for Rotorcraft Innovation/National Rotorcraft Technology Center Program 2007 Year End Review, Phoenix, AZ, Feb. 19-20, 2008.

Rejection Notice for Japanese Application No. 2008-542336, dated Feb. 23, 2011, 1 page.

REAPS Rotorcraft Protection, Brochure by RAFAEL Armament Development Authority, Ltd., Ordnance Systems Division, Haifa, Israel.

Kevin Coyne, F-111 Crew Module Escape and Survival Systems, pp. 1-10, http://www.f-111.net/ejection.htm.

Specification for PCT/US09/51821 filed on Jul. 27, 2009.

Response to Invitation to Correct Defects for PCT/US09/51821 dated Sep. 16, 2009.

International Search Report for PCT/US09/51821 dated Sep. 11, 2009.

Specification for PCT/US07/82140 filed on Oct. 22, 2007.

International Search Report for PCT/US07/82140 dated Apr. 18, 2008.

Article 34 Amendments for PCT/US07/82140 filed on Aug. 18, 2008.

International Publication of PCT/US07/82140 published on Apr. 30, 2009.

Article 34 Amendments for PCT/US07/82140 filed on Oct. 13, 2009.

Office Action from Corresponding Canadian Application No. 2,628,380, dated Dec. 23, 2009.

Office Action for U.S. Appl. No. 12/089,884, dated Aug. 6, 2010.

Office Action for U.S. Appl. No. 12/089,884, dated Dec. 8, 2010.

Notice of Allowance for U.S. Appl. No. 12/089,884, dated Jan. 26, 2011.

Office Action from Corresponding Canadian Application No. 2,628,380, dated Feb. 8, 2011.

First Examination Report from Corresponding Mexican Application No. Mx/2008/0060008, dated Mar. 22, 2011; Received in Office Apr. 6, 2011.

International Search Report for PCT/US06/43706 dated Jul. 18, 2008.

International Preliminary Report on Patentability for PCT/US06/43706 dated Mar. 19, 2009.

First Office Action in Chinese Application No. 200680041870.7 by the Chinese Patent Office, dated Apr. 29, 2011.

Notification of the Decision to Grant a Patent Right for Patent for Invention issued by the Patent Office of the People's Republic of China for related Chinese Patent Application No. 200680041870.7 on Jan. 21, 2012.

First Office Action from application 2007801012216. Issued from the Chinese Patent Office dated Apr. 27, 2012, 5 pages.

Extended European Search Report dated Aug. 6, 2012 from related European Patent Application No. 07844510.3.

Specification for PCT/US06/43706 filed Nov. 8, 2006.

Response to Invitation to Correct Defects for PCT/US06/43706 dated Apr. 7, 2008.

Publication of PCT/US06/43706 dated May 8, 2008.

International Preliminary Report on Patentability mailed by IPEA/US on Sep. 28, 2011 for International Patent Application No. PCT/US09/51815, 4 pages.

International Search Report and the Written Opinion of the International Searching Authority mailed by ISA/USA, U.S. Patent and Trademark Office on Apr. 25, 2011 for International Patent Application No. PCT/US11/025857, 8 pages.

International Search Report and the Written Opinion of the International Searching Authority mailed by ISA/USA, U.S. Patent and Trademark Office on Jun. 13, 2011 for International Patent Application No. PCT/US11/030514, 8 pages.

International Publication of related PCT Application No. PCT/US/09/051821 filed Jul. 27, 2009; Publication No. WO 2011/014153 A1.

Office Action dated Aug. 6, 2014 from counterpart EP App. No. 11859409.2.

Office Action dated Sep. 8, 2014 from counterpart CA App. No. 2,828,084.

Office Action dated Oct. 2, 2014 from counterpart CA App. No. 2,830,894.

Extended European Search Report dated Jul. 10, 2014 from counterpart EP App. No. 11862579.7.

Office Action dated Mar. 26, 2015 from counterpart EP App. No. 11862579.7.

* cited by examiner

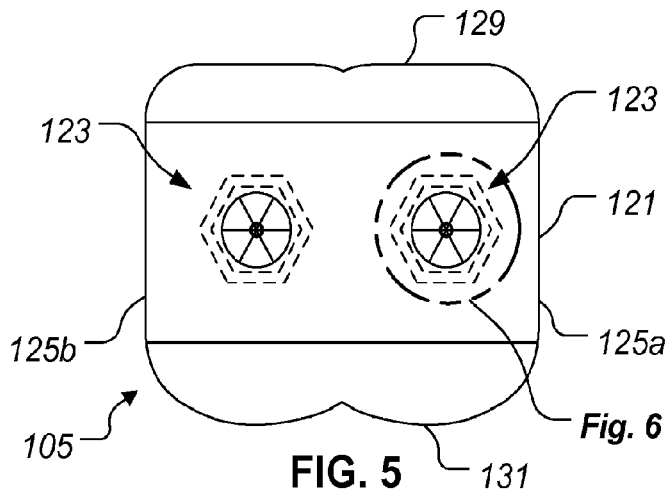
FIG. 5
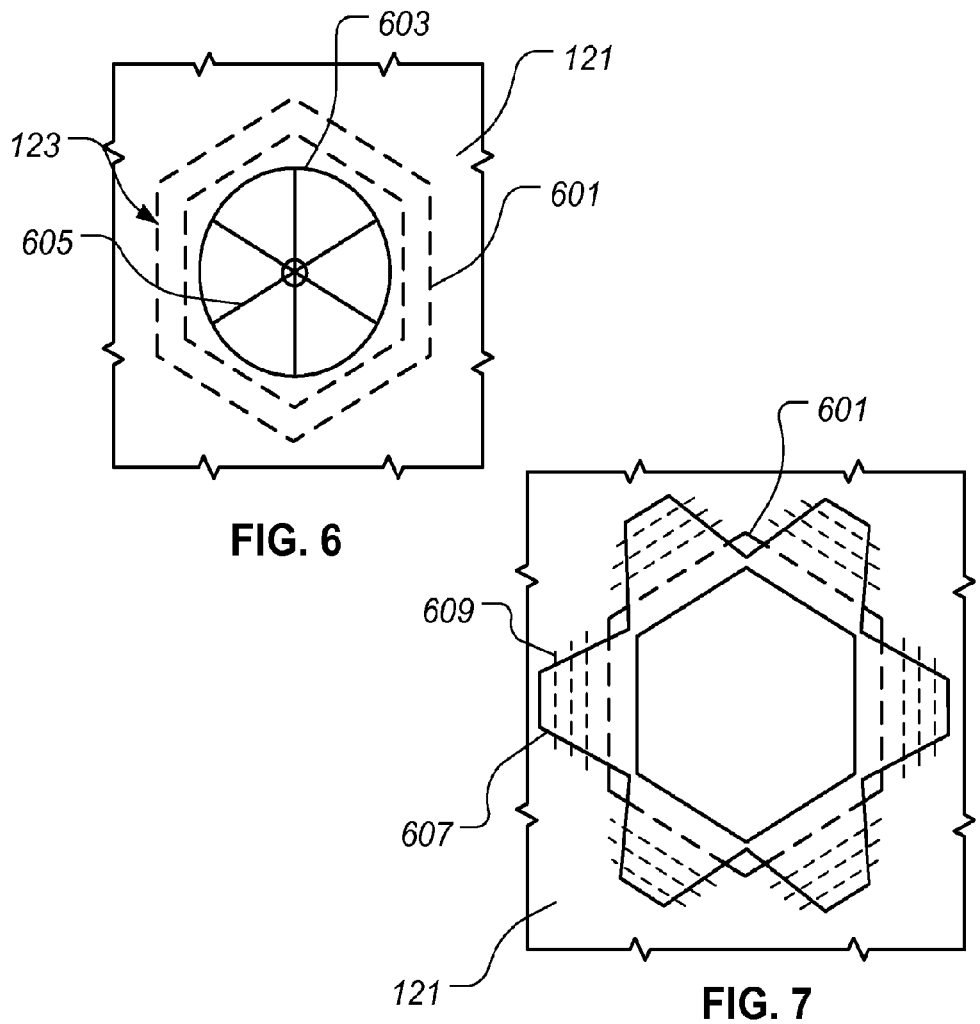
FIG. 6
FIG. 7

CONSTANT AREA VENT FOR EXTERNAL CRASH ATTENUATION AIRBAG

TECHNICAL FIELD

The system of the present application relates to external airbags for a vehicle. In particular, the system of the present application relates to a constant area vent for an external airbag for an aircraft.

DESCRIPTION OF THE PRIOR ART

Conventional airbags are manufactured in a wide variety of shapes and sizes. Conventional airbags have flexible vents which are susceptible to collapse during crash attenuation. Although the developments in airbag systems have produced significant improvements, considerable shortcomings remain.

BRIEF DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIG. 5 is a side view of the external airbag assembly of FIG. 4;

FIG. 6 is a detail view of the vent assembly taken from FIG. 5;

FIG. 7 is a partial detail view of the vent assembly taken from FIG. 6;

Figure 1:
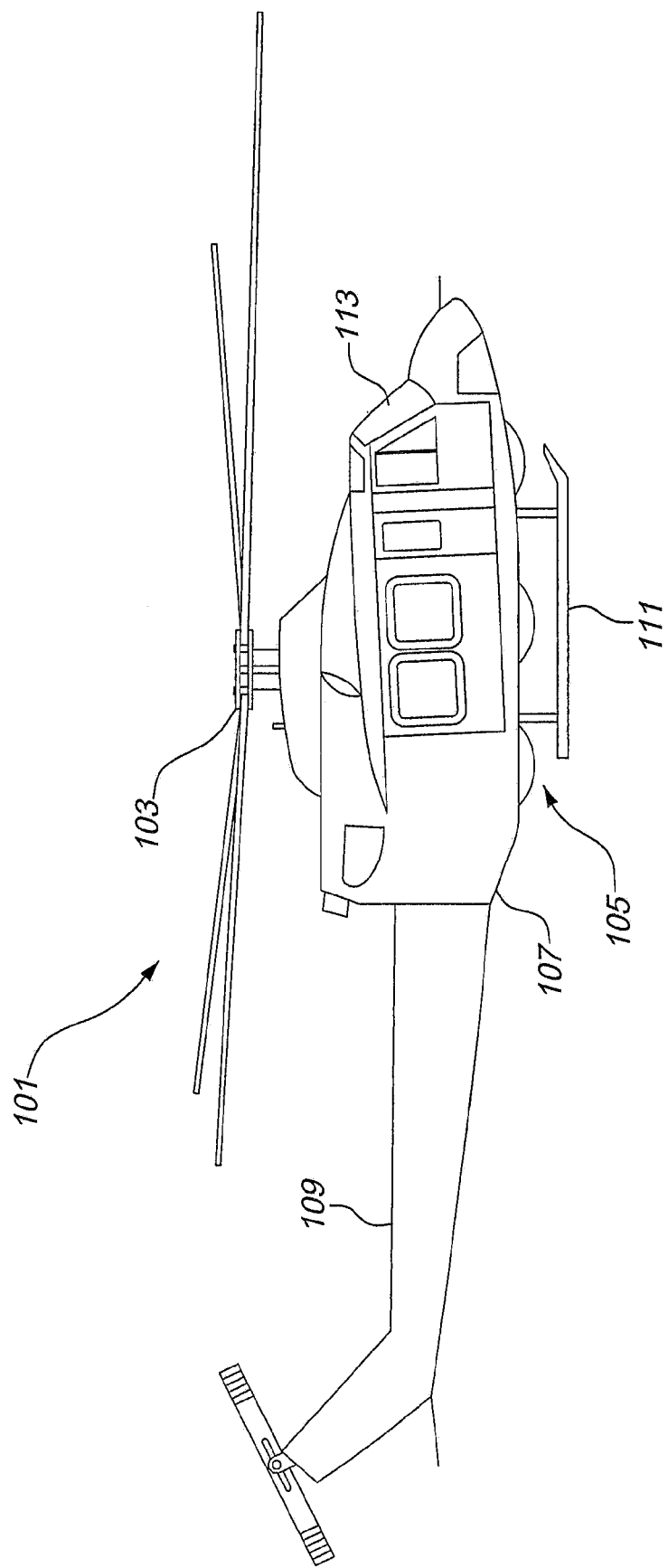
FIG. 1 is a perspective view of a rotorcraft equipped with an external airbag assembly, according to the preferred embodiment of the present application.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 shows a rotorcraft 101 incorporating the crash attenuation system according to the present application. Rotorcraft 101 comprises a fuselage 107 and a tail boom 109. A rotor system 103 provides lift and propulsive forces for flight of rotorcraft 101. A pilot sits in a cockpit 113 in a forward portion of fuselage 107. A landing gear 111 extends from a lower portion of fuselage 107 for supporting rotorcraft 101 on a rigid surface, such as the ground. At least one airbag assembly 105 is located approximate to the lower portion of fuselage 107. Each airbag assembly 105 may be external mounted, as shown in FIG. 1. Alternatively, each airbag assembly 105 may be internally mounted with tangible covers so that the airbags are deployable to the exterior of aircraft 101. It should be appreciated that even though landing gear 111 is depicted as skid gear, the systems of the present application may be implemented on a rotorcraft having other types of landing gear, such as a retractable landing gear, for example.

A malfunction with rotor system 103, the drive system, or any other flight critical component, may necessitate a descent from altitude at a higher rate of speed than is desirable. If the rotorcraft impacts an impact surface at an excessively high rate, the occupants of rotorcraft 101 may be severely injured due to the sudden decelerative forces. Further, such an impact may cause rotorcraft 101 to be severely damaged by the decelerative forces exerted on rotorcraft 101. To reduce these forces, the crash attenuation system includes at least one airbag assembly 105. Each airbag assembly 105 contains an inflatable airbag bladder 121 that is inflated prior to impact. Each airbag is vented during impact for energy attenuation in part to prevent an undesired rebound/secondary impact as well as to avoid pitch-over and roll-over tendency. In FIG. 1, each airbag assembly 105 is illustrated in an un-inflated stowed condition. The rotorcraft 101 preferably includes six airbag assemblies 105 in two rows have three airbag assemblies each. However, it should be appreciated that the quantity, size, and other features of each airbag assembly 105 may vary according to the specific aircraft. Each airbag assembly 105 absorbs and dissipates a specific amount of kinetic energy during crash attenuation; as such, the configuration and number of airbag assemblies 105 is at least partly driven by the mass of the aircraft. The system can be used on a number of different types of aircraft, for example, helicopter, fixed wing aircraft, and other aircraft, and in particular those that are rotorcraft.

Figure 2:
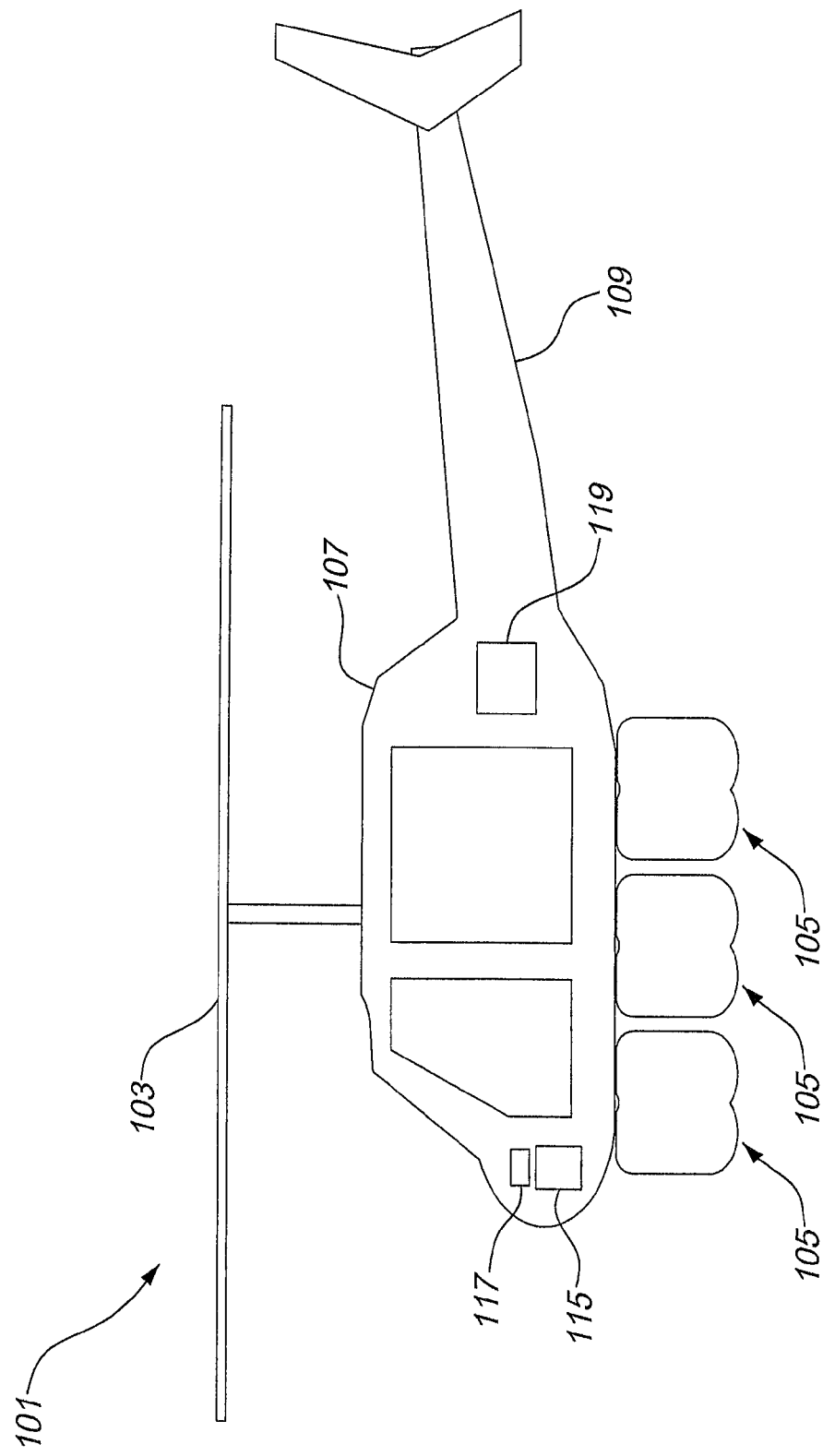
FIG. 2 is a stylized block diagram of the rotorcraft shown in FIG. 1.

Referring now to FIG. 2, airbag assembly 105 is illustrated in conjunction with a schematic of rotorcraft 101. Each airbag assembly 105 is shown as fully inflated and mounted to a lower portion of the fuselage 107. FIG. 2 also schematically illustrates additional components of the crash attenuation system according to the present application. A computer-based control system 115, which is shown mounted within fuselage 107, controls the operation of components associated with each airbag assembly 105. A gas controller 119 is operably associated with each airbag assembly 105 for controlling one or more gas generators for inflation of each airbag bladder. In addition, the crash attenuation system has a sensor system 117 for detecting crash conditions, such as rate of descent and/or ground proximity. Sensor system 117 may also have a water-detection system (not shown), which may have sensors mounted on fuselage 107 for detecting an imminent crash in water. Gas controller 119, components for each airbag assembly 105, and sensor system 117 are in communication with control system 115, allowing control system 115 to communicate with, monitor, and control the operation of these attached components. In addition, control system 115 may be in communication with a flight computer or other system for allowing the pilot to control operation of the crash attenuation system. For example, the pilot may be provided means to override, disarm, or arm the crash attenuation system.

The sensor system 117 is shown in FIG. 2 as a discrete component for the sake of convenience. However, it should be noted that actual implementations of the sensor system 117 can comprise a number of components that are located at various locations on the rotorcraft 101. The sensor system 117 may include, for example, sensors for detecting pitch and roll attitude, pitch and roll rate, airspeed, altitude, rate of descent, fluid at impact surface, and slope of the impact surface.

It is desirable for each airbag assembly 105 to be as efficient as possible at attenuating energy during a crash. Because each airbag assembly 105 is carried by an aircraft, each airbag assembly 105 ideally provides maximum energy attenuation while adding minimum weight to the aircraft. Furthermore, an unnecessarily heavy airbag assembly 105 increases the airframe structure required to support the weight, and also decreases the payload capabilities of the rotorcraft 101. Further, an efficient external airbag can have a lower profile than a less efficient airbag, thereby reducing aerodynamic drag, both while in a stowed position and an inflated position.

The present application includes the discovery that certain airbag vent systems provide better energy attenuation, as well as pitch-over and roll-over stability than others. More specifically, venting of pressurized gas from within the airbag is an important part of providing optimal energy attenuation and aircraft stability during a crash landing. Furthermore, proper venting reduces high peak acceleration that might other occur if the vent were to collapse, resulting in blockage and reducing effectiveness of the vent itself, during crash attenuation.

Figure 3:
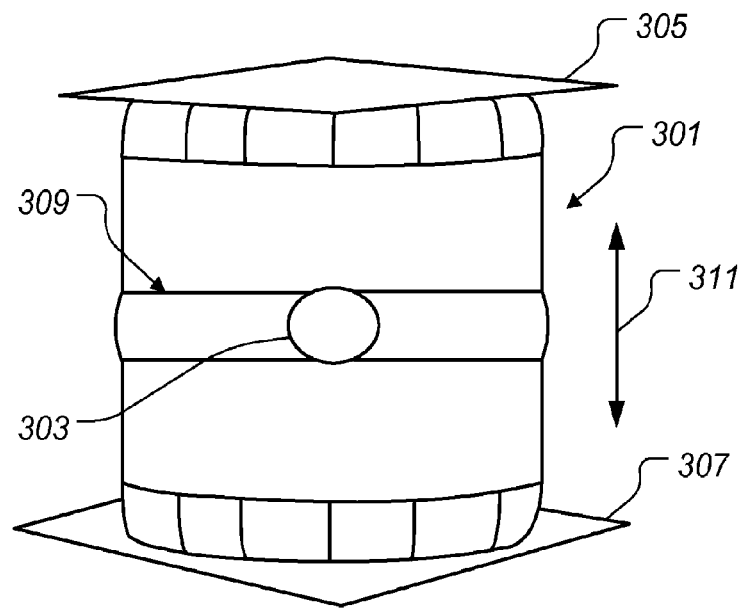
FIG. 3 is a schematic view of an external airbag in compression.

Referring to FIG. 3, an airbag 301 is depicted in order to exemplify a collapsible airbag vent 303. Certain airbag shapes, such as cylindrically shaped airbag 301, are susceptible to hoop stresses circumferentially around the airbag. Compression of airbag 301 along a direction 311 is a result of an aircraft surface 305 and a ground surface 307 rapidly compressing airbag 301 during a crash. During compression of airbag 301, pressure builds until vent 303 ruptures a predetermined pressure. Vent 303 is configured to release pressurized gas in order to dissipate energy. However, the opening in vent 303 gives rise to the aforementioned hoop stress, and results in a circumferential distortion 309. Distortion 309 results in a tendency for vent 303 to collapse during compression of airbag 301 along direction 311. Collapsing of vent 303 inhibits the desired release of pressurized gas, thus resulting in a spike in deceleration of the aircraft during an impact. A high peak acceleration results in less survivability during an impact. As such, it is desirable for vent 303 to remain in an open position. More specifically, it is desirable for the area of vent 303 to remain constant during compression of airbag 301, thus providing a predictable and efficient attenuation of energy during an impact situation.

Figure 4:
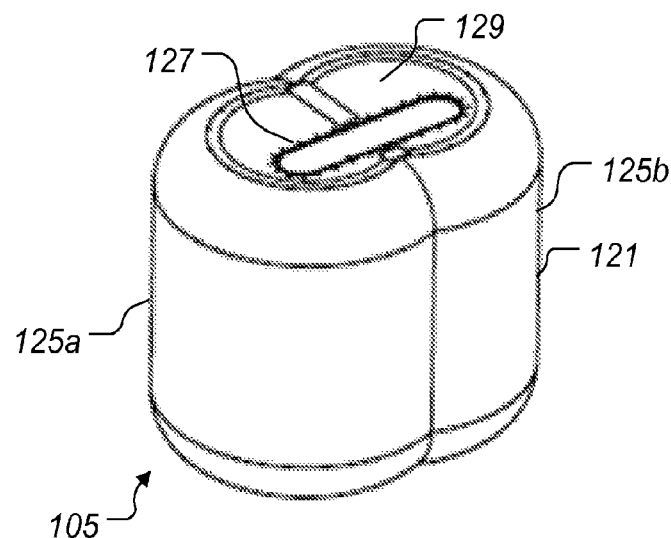
FIG. 4 is a perspective view of an external airbag assembly, according to the preferred embodiment of the present application.

Referring now to FIG. 4, airbag assembly 105 is illustrated. Airbag assembly 105 is depicted in a dual cylindrical configuration. A cylindrical shaped airbag provides an efficient shape of an external airbag because the cylindrical shape promotes compression along a center lengthwise axis of the vertical cylinder, which is generally normal to the aircraft. Such a cylindrical shape provides an efficient shape for energy attenuation by providing approximately linear deceleration of the rotorcraft. Airbag assembly 105 is a dual cylindrical configuration because such the shape provides optimal coverage underneath a rotorcraft, such aircraft 101, while also reaping the efficiency of an airbag having a cylindrical shape. However, it should be appreciated that airbag assembly 105 may be any shape.

Still referring to FIG. 4, airbag assembly 105 includes an airbag bladder 121, which is made from a relatively nonporous flexible material. In the preferred embodiment, the airbag bladder 121 is formed of a fabric that comprises resilient material such as KEVLAR and/or VECTRAN. Airbag assembly 105 includes a base plate 127 configured to attach the airbag bladder 121 underneath fuselage 107. More particularly, base plate 127 is coupled to a top portion 129 of airbag bladder 121. Base plate 127 is preferably a rigid structure which also functions to at least partially define top portion 129. A widthwise panel essentially divides the airbag bladder 121 into two cylindrical portions, a first cylindrical portion 125a and a second cylindrical portion 125b.

Referring now to FIGS. 5 and 6, airbag assembly 105 is depicted in further detail. Airbag assembly 105 includes at least one vent assembly 123. During operation, each airbag assembly 105 is stored in an uninflated condition underneath the fuselage 107 of rotorcraft 101, as shown in FIG. 1. When an imminent crash situation is detected, each airbag bladder 121 is fully inflated just prior to impact. In the preferred embodiment, the airbag bladder 121 is inflated to a certain initial pressure. In the preferred embodiment, each vent assembly 123 is configured to burst at a vent burst portion 605, at a certain pressure, thereby releasing gas from the interior of the airbag bladder 121 during the impact cycle. It should be appreciated that alternative burst pressures may be used. The compression of airbag bladder 121 results from the airbag bladder 121 being compressed between the rotorcraft 101 and an impact surface, such as a hard surface, soft soil, water, to name a few.

Figure 8:
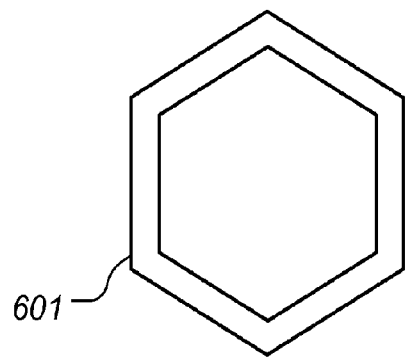
FIG. 8 is a detail view of a vent support according to the preferred embodiment of the present application.

Vent assembly 123 includes a vent support 601 for preserving the area of vent opening 603 during compression of airbag bladder 121. More specifically, vent support 601 keeps the open area of vent opening 603 constant by preventing deformation of vent opening 603 due to hoop stresses. Vent support 601 is preferably of a rigid material, such as composite, plastic, and metal, to name a few. Vent support 601 may be attached to airbag bladder 121 in a variety of ways. For example, FIG. 7 illustrates an exemplary configuration of attaching vent support 601 to airbag bladder 121. Material from airbag bladder 121 is fabricated so that support portions 607 are positioned through the interior of vent support 601, then folded over vent support, and attached to airbag bladder 121. As shown in FIG. 7, the hexagon shape of vent support 601 provides for six support portions 607 to each be aligned with each edge of vent support 601. Moreover, a plurality of stitching portions 609 are used to attach each support portion 607 to airbag bladder 121, thereby trapping vent support 601. It should be appreciated that vent support 601 may be attached to airbag bladder in a variety of methods and configurations. Furthermore, FIG. 8 illustrates vent support 601 in detail view.

Figure 9:
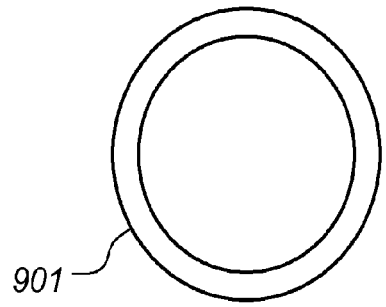
FIG. 9 is a detail view of a vent support according to an alternative embodiment of the present application.
Figure 10:
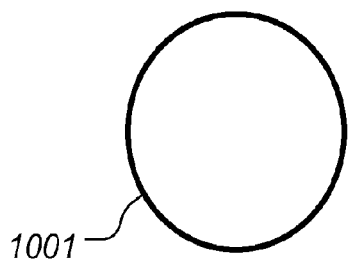
FIG. 10 is a detail view of a vent support according to an alternative embodiment of the present application.
Figure 11:
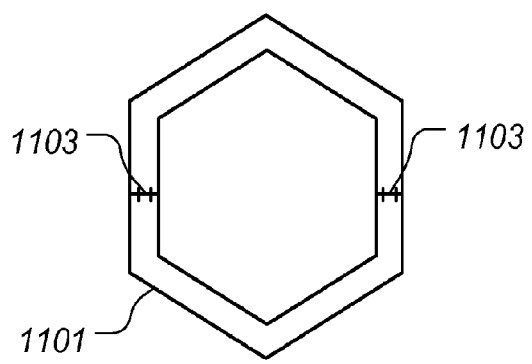
FIG. 11 is a detail view of a vent support according to an alternative embodiment of the present application.

FIGS. 9-11 illustrate alternative embodiments of vent support 601. For example, a vent support 901 is a circular shaped. A vent support 1001 is annular ring shaped. It should be appreciated the vent support may be of a wide variety of shapes while also providing the sufficient rigidity to keep vent opening 603 from collapsing.

FIG. 11 illustrates another alternative embodiment of vent support 601. A vent support 1001 includes an upper portion and a lower portion, which are connected by a hinge 1003 on each side. Hinges 1003 allow vent support 1001 to collapse while airbag assembly 105 is packaged in an uninflated condition, as shown in FIG. 1. Upon inflation of the airbag, each hinge 1003 allows the upper and lower portions of vent support 1001 to open. Further, each hinge 1003 includes a locking mechanism so that the vent support 1001 locks in the open position so that it isn't able to return to the folded position.

The airbag assembly of the present application provides significant advantages, including providing a vent assembly with a vent support to maintain constant area venting during compression of the airbag bladder.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. An external airbag for an aircraft, the external airbag comprising:
   an inflatable bladder configured to be inflated exterior of the aircraft;
   a vent integrated with and coupled to the inflatable bladder, the vent having a vent opening configured to release pressure within the inflatable bladder in order to dissipate energy; and
   a vent support coupled to the inflatable bladder and located near the vent, the vent support being configured to prevent deformation of the vent opening due to hoop stresses as pressure within the inflatable bladder increases;
   wherein the vent support is rigid and is annular; and
   wherein the vent support includes an upper portion and a lower portion;
   wherein the upper portion and the lower portion of the vent support are hinged together around the vent.

2. The external airbag according to claim 1, wherein the vent support is hexagonally shaped.

3. The external airbag according to claim 1, wherein the vent support is circular.

4. The external airbag according to claim 1, wherein the inflatable bladder is cylindrically shaped.

5. The external airbag according to claim 1, wherein the inflatable bladder has a first cylinder and a second cylinder, the first and second cylinders connected to form a dual cylindrical shape.

6. The external airbag according to claim 1, wherein the vent support is metallic.

7. The external airbag according to claim 1, wherein further the vent support is attached to the inflatable bladder by a fabric, the fabric being attached to the inflatable bladder thereby entrapping the vent support.

8. The external airbag according to claim 7, wherein the vent support is attached to the inflatable bladder through a stitching process.

9. The external airbag according to claim 7, wherein the vent support is attached to the inflatable bladder through a thermal bonding process.

10. The external airbag according to claim 1, wherein the vent support is attached to the inflatable airbag with an adhesive.

11. An external airbag for an aircraft, the external airbag comprising:
   an inflatable bladder which is inflatable to an exterior of an aircraft so that the inflatable bladder is generally located between the aircraft and a crash surface when inflated;
   a vent configured to burst at a predefined burst pressure, the vent being located along a side portion of the inflatable bladder;
   a vent support located approximate the vent, the vent support being configured to prevent deformation of a venting area of the vent;
   wherein the vent support is rigid and is annular; and
   wherein the vent support includes an upper portion and a lower portion;
   wherein the upper portion and the lower portion of the vent support are hinged together around the vent.

12. The external airbag according to claim 11, wherein the inflatable bladder is cylindrically shaped.

13. The external airbag according to claim 11, wherein the inflatable bladder is pressurized between 1 psi and 15 psi prior to an impact.

14. The external airbag according to claim 11, wherein the vent includes a burst portion, the predefined burst pressure is between 3 psi and 25 psi.

15. The external airbag according to claim 11, wherein the vent support is configured to provide structural integrity around the vent.

16. An aircraft having a crash attenuation system, comprising:
   a fuselage;
   a rotor system;
   an airbag assembly located near a lower portion of the fuselage, the airbag assembly comprising:
      an airbag bladder which is inflatable to an exterior of the fuselage;
      a vent located in the airbag bladder, the vent configured so as to extend to the exterior of the fuselage with the airbag bladder as the airbag bladder is inflated, the vent being configured to burst at a predefined pressure;

a rigid vent support located approximate the vent, the vent support being configured to resist deformation of the vent during compression of the airbag bladder;
wherein the rigid vent support is annular shaped; and
wherein the rigid vent support includes an upper portion and a lower portion;
wherein the upper portion and the lower portion of the rigid vent support are hinged together around the vent.

17. The aircraft according to claim 16, wherein the airbag bladder is at least partially cylindrically shaped.

* * * * *